United States Patent [19]

Bauvois

[11] Patent Number: 5,288,442
[45] Date of Patent: Feb. 22, 1994

[54] PROCESS FOR THE MANUFACTURE OF A COMPLEX MOULDED STRUCTURE, AND ESPECIALLY OF A SKI

[75] Inventor: Jean Bauvois, Villard De Lans, France

[73] Assignee: Skis Rossignol S.A., France

[21] Appl. No.: 900,435

[22] Filed: Jun. 18, 1992

[30] Foreign Application Priority Data

Jul. 31, 1991 [FR] France .................................. 91 09970

[51] Int. Cl.[5] .............................................. B29C 67/22
[52] U.S. Cl. ................................ 264/45.2; 264/46.6; 264/46.7; 264/275
[58] Field of Search .................... 264/46.4, 45.2, 46.5, 264/46.6, 46.7, 314, 275

[56] References Cited

U.S. PATENT DOCUMENTS

| | | | |
|---|---|---|---|
| 3,968,561 | 7/1976 | Oakes et al. | 264/46.6 |
| 4,250,585 | 2/1981 | Theriault et al. | 264/46.7 |
| 4,457,729 | 7/1984 | Peerlkamp | 264/46.6 |
| 4,557,888 | 12/1985 | Rausing et al. | 264/314 |
| 4,634,563 | 1/1987 | Hancock | 264/46.7 |
| 4,681,725 | 7/1987 | Maruyama | 264/46.6 |
| 4,711,462 | 12/1987 | Hayashi et al. | 264/46.7 |
| 5,023,042 | 6/1991 | Efferding | 264/45.2 |
| 5,071,605 | 12/1991 | Kawaguchi et al. | 264/45.2 |
| 5,093,055 | 3/1992 | Skiff | 264/45.2 |

FOREIGN PATENT DOCUMENTS

| | | |
|---|---|---|
| 0428885 | 5/1991 | European Pat. Off. . |
| 0430824 | 6/1991 | European Pat. Off. . |
| 3146381 | 6/1983 | Fed. Rep. of Germany ..... 264/46.8 |
| 1248660 | 11/1960 | France . |
| 2424470 | 11/1979 | France . |

*Primary Examiner*—Allan R. Kuhns
*Attorney, Agent, or Firm*—Parkhurst, Wendel & Rossi

[57] ABSTRACT

Process for the manufacture of a complex moulded structure, constituted by a foam core (16) made from plastic and on its periphery by two, respectively upper (11, 12) and lower (6, 8, 9), half-shells, includes the following steps:

depositing in a mould (1, 2) a first element (6, 7, 8, 9) intended to form the lower half-shell, depositing on this first element (6, 8, 9) a deformable tubular element (13, 14, 17);

depositing on top of this deformable tubular element (14) a second element (11, 12) intended to form the upper half-shell, closing the mould, injecting into the deformable tubular element (13, 14, 17) reactants intended to react in order to form a foam which expands in situ until pressing the element (11, 12) against the walls (3, 4, 10) of the mould, cooling the contents of the mould, and finally opening the mould in order to withdraw the complex moulded structure thus obtained, characterized in that at least the upper portion of the deformable tubular element (14) is rigid.

13 Claims, 2 Drawing Sheets

PROCESS FOR THE MANUFACTURE OF A COMPLEX MOULDED STRUCTURE, AND ESPECIALLY OF A SKI

BACKGROUND OF THE INVENTION

The invention relates to a process for the manufacture of a complex moulded structure. It also relates to the complex moulded structures and especially to the skis thus obtained.

By "complex moulded structure" is traditionally meant a moulded structure containing:
stiffening or reinforcing elements being in the form of wires or in the form of cloths, or even in the form of plates,
and, possibly, protection elements,
and/or various mechanical elements such as, for example, damping elements, lightening elements, etc.
and, possibly, decoration elements.

Within the scope of the production of such structures, one of the main concerns consists in seeking a process capable of permitting a high degree of automation whilst optimizing the technical and mechanical characteristics of the final structure obtained.

Among the various processes known to date for the production of such structures, one of them consists in using the pressure caused by the expansion of a foam made from plastic, especially from polyurethane, in order for the various elements entering in the composition of the structure to be pressed against the interior walls of a shaping mould (see for example French Patent FR-A-2,553,669).

Now, in general, and especially in the framework of the application to skis, use is frequently made, as stiffening and/or reinforcing element, of textile materials in the form of cloths advantageously preimpregnated with a solventless resin, which during the production of the structure develops adhesive properties, especially in contact with the central core.

Now the use of a central core of the polymerizable foam type in association with such a preimpregnated reinforcing element comes up against a major difficulty: in fact, incompatibility or, on the contrary, affinity phenomena sometimes arise between the constituent elements of the foam of the central core and the constituent elements of the resin for impregnating the preimpregnated fabric, leading to local alterations in the cohesion of the structure, unacceptable for numerous applications and especially for a ski. These phenomena may induce adhesion defects between these two elements, leading to a structure being obtained which is imperfect from the point of view of its mechanical properties.

In document FR-A-1,248,660, it has been proposed, for the production of such a structure, to install an air chamber in the mould, then to inflate this air chamber by means of compressed air, the result of which presses the constituent elements of the structure against the walls of the mould, and finally to inject a polymerizable foam into the space thus provided.

Although for sure this process enables previously mentioned drawbacks to be overcome, on the other hand it requires at least two steps, namely the inflation of the air chamber and then the injection of the reactants of the core, therefore longer to implement and furthermore relatively difficult to be able to be automated.

SUMMARY OF THE INVENTION

The invention alleviates these various drawbacks. It proposes a process for the production of a complex moulded structure, easily able to be automated, which overcomes all the difficulties connected with the use of mutually incompatible substances.

This process for the manufacture of a complex moulded structure, constituted by a foam core made from plastic and on its periphery by two, respectively upper and lower/half-shells, includes the following steps:
depositing in a mould a first element intended to form the lower half-shell,
depositing on this first element a deformable tubular element;
depositing on this deformable tubular element a second element intended to form the upper half-shell;
closing the mould;
injecting into the deformable tubular element reactants intended to react in order to form a foam which expands in situ until pressing the element against the walls of the mould;
cooling the contents of the mould,
and finally opening the mould in order to withdraw the complex moulded structure thus obtained.

This process is characterized in that the upper portion of the deformable tubular element is rigid.

In other words, the invention consists in inserting, prior to the injection of the constituent reactants of the plastic foam, an intermediate barrier between the respectively lower and upper half-shells and the core of the structure, of which barrier the upper portion consists of a rigid reinforcing element intended, under the action of the expansion of the plastic foam, to press against the upper half-shell and to encourage the upper half-shell to press against the wall of the mould. This barrier, beyond its role of sealing between the resins for impregnating the upper and lower half-shells and the plastic foam of the core, must also develop good properties of adhesion with the elements which it separates.

According to an advantageous form of the invention, the tubular element is closed. In other words, it consists of an upper rigid plate, the element being closed by a single flexible, deformable and stretchable shell solidly attached in the region of the two lateral edges of the said plate, and this is achieved by any means, especially by adhesive bonding, welding, clamping, clipping, buttoning, prior to its insertion into the mould.

In another embodiment of the invention, the upper portion and the lower portion of the tubular element consist of rigid plates. These two portions are then Joined together in order to constitute a tubular element closed by two flexible, deformable and stretchable elements attached, as described previously, in the region of the two lateral edges of the said portions.

This rigid portion may consist of a metal plate, for example made from ZICRAL, or of a prepolymerized, and therefore cured, laminate, or even of a cured-resin plate, or of a plate made from paper and cured using phenolic or melamine resin, or of a sheet of wood veneer.

According to the invention, the flexible, extensible and deformable element consists of a material chosen from the group constituted by thermoplastic polyurethanes, polyetheramide block copolymers and nitrile-modified polyetheramide block copolymers or a mixture of these substances.

The invention also relates to the complex moulded structure obtained by this process.

This structure is characterized in that a core of expanded foam is separated from the respectively upper and lower half-shells by an element adhering to this core and to the two half-shells, comprising at least one rigid upper plate, interposed between the said core and the upper half-shell, and a flexible film on at least the two side walls or edges of the structure.

BRIEF DESCRIPTION OF THE DRAWINGS

The manner in which the invention may be carried out and the advantages which stem therefrom will become more apparent from exemplary embodiments which follow, given by way of non-limiting indication in support of the attached drawings.

DETAILED DESCRIPTION OF THE INVENTION

Figure 1:
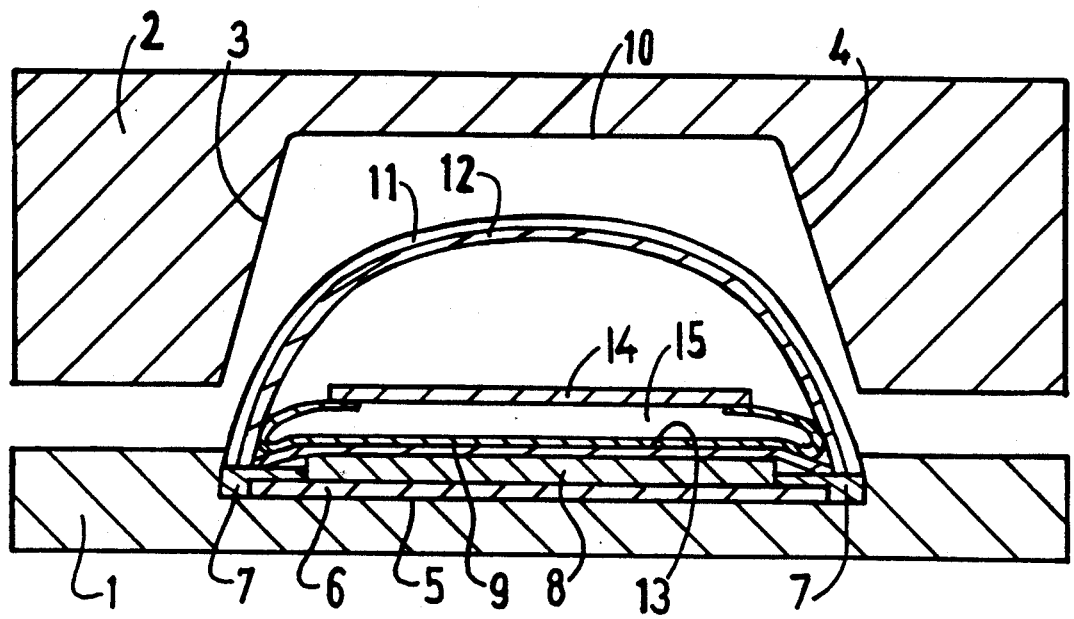
FIG. 1 is a transverse cross-section of a mould, before closing, for the production of a complex moulded structure.
Figure 2:
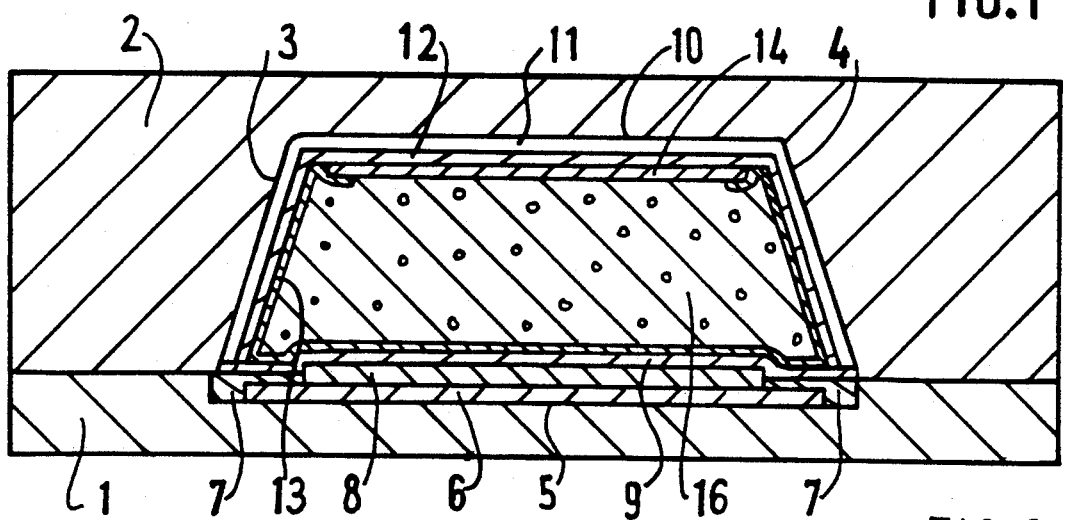
FIG. 2 is a transverse cross-section of the abovementioned mould, after expansion of the foam.

The description relates to the production of skis. Nevertheless, it goes without saying that the scope of the invention should not be limited to this single application.

A first half-shell constituted first of all by a sole plate (6), typically made from polyethylene and limited in the region of its lateral edges by two flanges (7) made from steel, is deposited flat and at the bottom (5) of a mould defined by its lower (1) and upper (2) cavities, respectively. The sole plate (6) is surmounted by a mechanical reinforcing plate (8) made, for example, from ZICRAL and itself covered with a reinforcing element (9) constituted by a unidirectional textile cloth preimpregnated with an epoxy resin. ZICRAL includes aluminum in addition to Si, Fe, Cu, Mn, Mg, Cr, Zn, Zr and Ti, and is registered with the Aluminum Association, Washington, D.C., under register designation No. 7049A.

Figure 3:
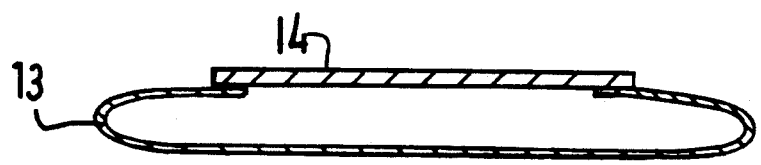
FIG. 3 is a diagrammatic view of a detail of FIG. 1.

A tubular element characteristic of the invention, seen in detail in FIG. 3, constituted respectively by an upper rigid plate (14), for example made from ZICRAL, and furthermore by a shell (13), is positioned above this first half-shell. This shell (13) consists of a mixture of polyurethane and a polyetheramide block copolymer. This shell (13) is solidly attached to the rigid plate (14) in the region of the lateral edges of the latter, and especially by adhesive bonding or welding, for example.

This shell (13) is flexible, stretchable and deformable. Furthermore it is impervious and capable of displaying, on increasing the temperature, properties of adhesion, especially with the resin for preimpregnating the reinforcing element (9) but also, as will be stated subsequently, with the resin for preimpregnating the reinforcing element (12). Furthermore, these properties of adhesion are capable of being displayed with the core made from foam, by the exothermic reaction resulting from the expansion of the components of the polyurethane which are injected into the tubular element.

This tubular element is in turn covered with an upper half-shell consisting first of all of a second reinforcing element (12) also made by a unidirectional textile cloth preimpregnated with solventless epoxy resin, which cloth is surmounted by a decorative element (11), for example made from ABS. This upper half-shell, although relatively flexible, develops a certain rigidity when cold, such that it is held in a slightly curved form by the interaction of its lateral ends with the lateral walls (3 and 4) of the mould.

As a result, an interior space (15) is created between the two, respectively lower and upper, half-shells.

The plate (14) may possibly be prepositioned by adhesively prebonding beneath and against the reinforcing element (12) of the upper half-shell.

Next the mould is then closed; the latter is heated and next, correlatively, the constituents of a polyurethane foam, namely a polyol and an isocyanate, are injected into the interior of the tubular element defined by the rigid upper plate (14) and the shell (13). In a known fashion, these constituents expand in situ by developing an exothermic reaction causing first of all the rigid plate (14) to press against the upper half-shell (11, 12) and then, still under the action of this expansion, causing the upper half-shell (11, 12) to press against the upper (10) and lateral (3, 4) walls of the mould, thus conferring on the final structure its ultimate shape.

This pressing is made possible by the sealing of the tubular element (13, 14), preventing the expanding foam, on the one hand, from coming into contact with the reinforcing elements (9 and 12) and, on the other hand, from traversing them.

Furthermore, and advantageously, the two exterior and interior surfaces of the rigid plate (14) are subjected to a preparation treatment for adhesive bonding, in order to ensure, when this plate presses against the upper half-shell (11, 12), an adhesion between these two elements and between the plate (14) and the polyurethane foam.

This preparation treatment may consist of an electrochemical treatment and, especially, an anodization intended to create a microporous and rugose oxide layer at its surface, in order to facilitate the adhesive bonding of the polyurethane foam.

Taking into account the fact that the shell (13), under the action of the temperature, also develops adhesion properties, on the one hand with respect to the epoxy resin for impregnating the reinforcing elements (9, 12), and on the other hand with respect to the core (16) made from polyurethane foam, this confers on the final structure a very high cohesion, limiting, or indeed eliminating, all risk of delamination.

In order to optimize the mechanical reinforcing role of the plate (14), it is advisable for its dimensions, especially its width, to correspond substantially to the width of the upper portion of the mould (10), to within the clearance of the thicknesses of the upper half-shell.

Figure 4:
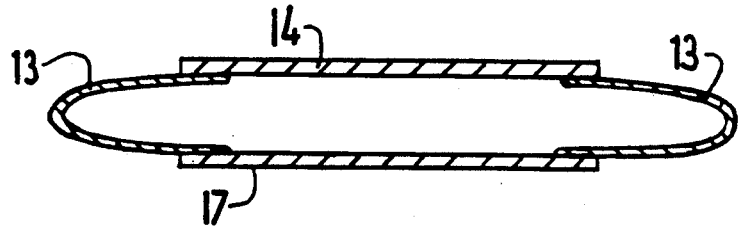
FIG. 4 is a diagrammatic view of a detail of FIG. 5.
Figure 5:
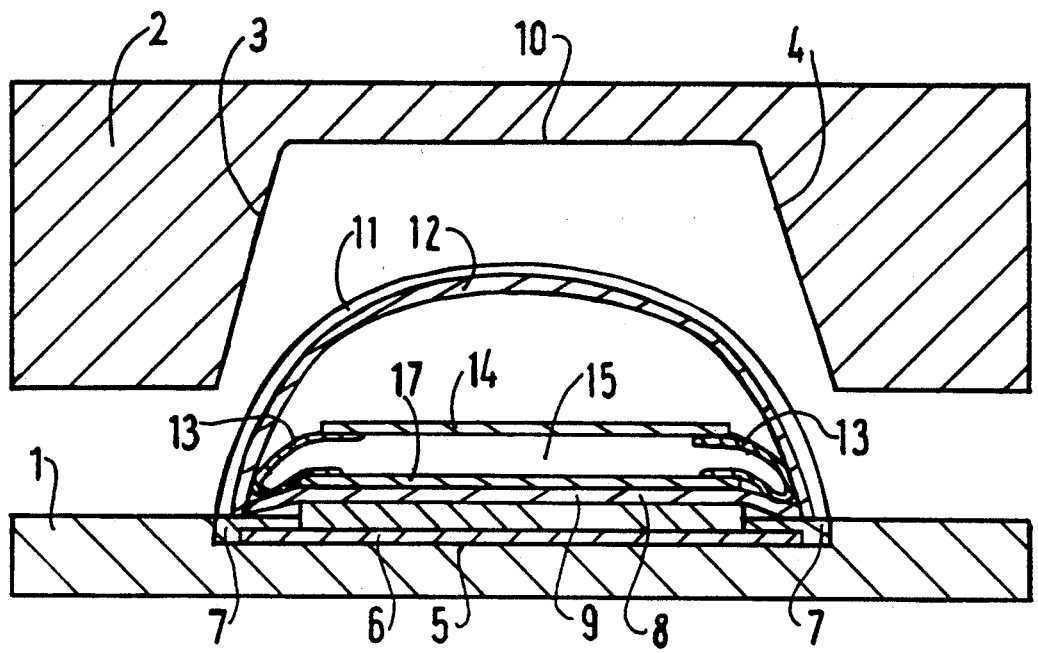
FIG. 5 is a transverse cross-section of a mould for the production of a complex moulded structure prior to the injection of the constituent reactants of the foam, according to another embodiment of the invention.
Figure 6:
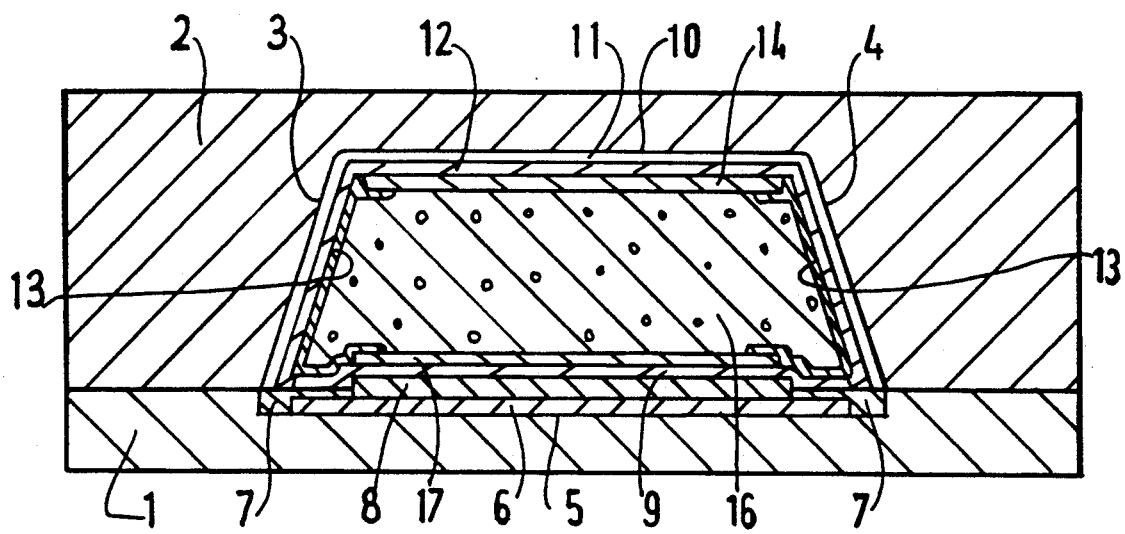
FIG. 6 is a transverse cross-section of the mould of FIG. 5 after expansion of the foam.

In another embodiment shown in FIGS. 4, 5 and 6, the tubular element consists of, on the one hand, an upper plate (14) also made from ZICRAL or from prepolymerized laminate, or else from a cured-resin plate, especially a melamine-based or phenolic resin, but also a lower plate (17) of the same kind, the two plates (14, 17) being joined together in the region of their lateral edges by flexible elements (13) of the same kind as described previously, which are also solidly attached to the edges of the element (14) and to the element (17), either by adhesive bonding or by welding.

Its installation and the process for producing the structure remain in accordance with those described previously. This particular structure enables the rigidity of the final structure obtained, and its balancing with respect to the neutral fiber to be increased because of the presence of this additional lower stiffening plate.

The process thus described enables the automation of the manufacturing lines to be furthered insofar as it results in the elimination of the adhesive prebonding operations between the ZICRAL plate or the rigid plate and the fabric reinforcements. Correlatively, it confers on the structure obtained and especially on the ski, a very high cohesion which is particularly desirable for its applications.

I claim:

1. A process for manufacturing a complex molded structure having a plastic foam core surrounded by an upper half-shell and a lower half-shell, said process comprising:

depositing in a mold a first element which forms the lower half-shell;

depositing on the first element a tubular element having at least a rigid, non-stretchable upper portion and deformable side portions;

depositing on the tubular element a second element which forms the upper half-shell;

closing the mold;

injecting into the tubular element reactants which react to form a foam which expands in situ to press the second element against walls of the mold;

cooling the contents of the mold; and opening the mold to remove the complex molded structure.

2. The process of claim 1, wherein the tubular element comprises a rigid, non-stretchable upper plate closed by a flexible, stretchable and deformable shell fastened to lateral edges of the upper plate.

3. The process of claim 2, wherein the flexible stretchable and deformable shell is fastened to the rigid, non-stretchable upper plate by at least one of adhesive bonding, welding, clamping, clipping and buttoning.

4. The process of claim 2, wherein the rigid, non-stretchable upper plate is produced from a material selected from the group consisting of metal, metal alloy, prepolymerized laminate, cured resin, paper cured using phenolic or melamine resin, and wood veneer.

5. The process of claim 4, wherein said metal alloy is an aluminum-based alloy.

6. The process of claim 2, wherein the flexible, stretchable and deformable shell is made from at least one material selected from the group consisting of thermoplastic polyurethanes, polyetheramide block copolymers, and nitrile-modified polyetheramide block copolymers.

7. The process of claim 1, wherein the tubular element comprises rigid, non-stretchable upper and lower plates, and two flexible, stretchable and deformable elements fastened to lateral edges of the upper and lower plates.

8. The process of claim 7, wherein the flexible, stretchable and deformable elements are fastened to the rigid, non-stretchable upper and lower plates by at least one of adhesive bonding, welding, clamping, clipping and buttoning.

9. The process of claim 7, wherein the rigid, non-stretchable upper and lower plates are produced from a material selected from the group consisting of metal, metal alloy, prepolymerized laminate, cured resin, paper cured using phenolic or melamine resin, and wood veneer.

10. The process of claim 7, wherein said metal alloy is an aluminum-based alloy.

11. The process of claim 7, wherein the flexible, stretchable and deformable elements are made from at least one material selected from the group consisting of thermoplastic polyurethanes, polyetheramide block copolymers, and nitrile-modified polyetheramide block copolymers.

12. The process of claim 5, wherein said aluminum-based alloy further comprises Si, Fe, Cu, Mn, Mg, Cr, Zn, Zr and Ti.

13. The process of claim 10, wherein said aluminum-based alloy further comprises Si, Fe, Cu, Mn, Mg, Cr, Zn, Zr and Ti.

* * * * *